(No Model.) 2 Sheets—Sheet 1.

J. H. RYAN.
AMIMAL MOUTH OPENER.

No. 490,602. Patented Jan. 24, 1893.

Attest:
Walter Tamariss
E. B. Harned

Inventor:
James H. Ryan
By J. W. Powers Attorney (No Model.) 2 Sheets—Sheet 2.
J. H. RYAN.
AMIMAL MOUTH OPENER.
No. 490,602. Patented Jan. 24, 1893.
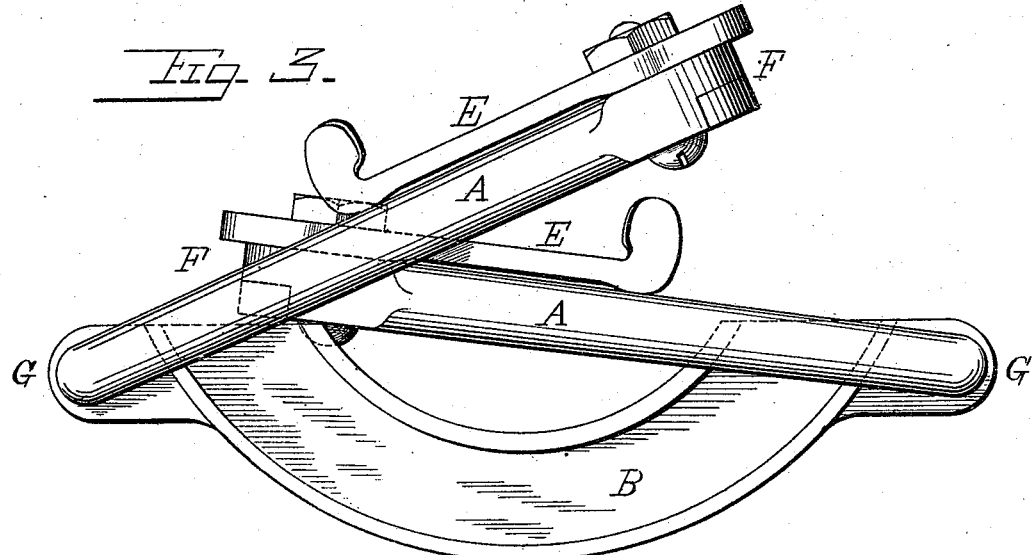
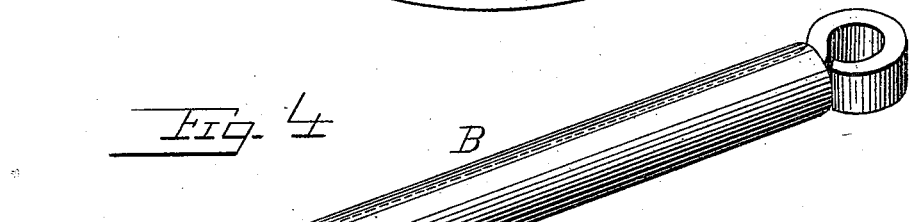
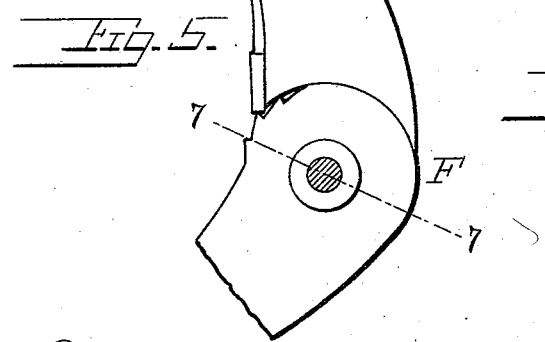
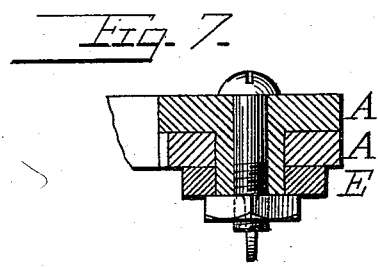
Attest:
Walter Famariss
E. B. Harned
Inventor:
James H Ryan
By J W Powers Attorney
THE NORRIS PETERS CO., PHOTO-LITHO., WASHINGTON, D. C.

UNITED STATES PATENT OFFICE.

JAMES H. RYAN, OF SYCAMORE, ILLINOIS.

ANIMAL MOUTH OPENER.

SPECIFICATION forming part of Letters Patent No. 490,602, dated January 24, 1893.

Application filed August 18, 1892. Serial No. 443,456. (No model.)

*To all whom it may concern:*

Be it known that I, JAMES H. RYAN, a citizen of the United States, residing at Sycamore, in the county of De Kalb and State of Illinois, have invented a new and useful Improvement in Animal Mouth Openers, of which the following is a specification.

The purpose of my invention is to provide a device to facilitate the administration of medicine to horses or other animals, or to facilitate working in the mouths of such animals, or their teeth or adjacent organs reached through their mouths.

Figure 1:
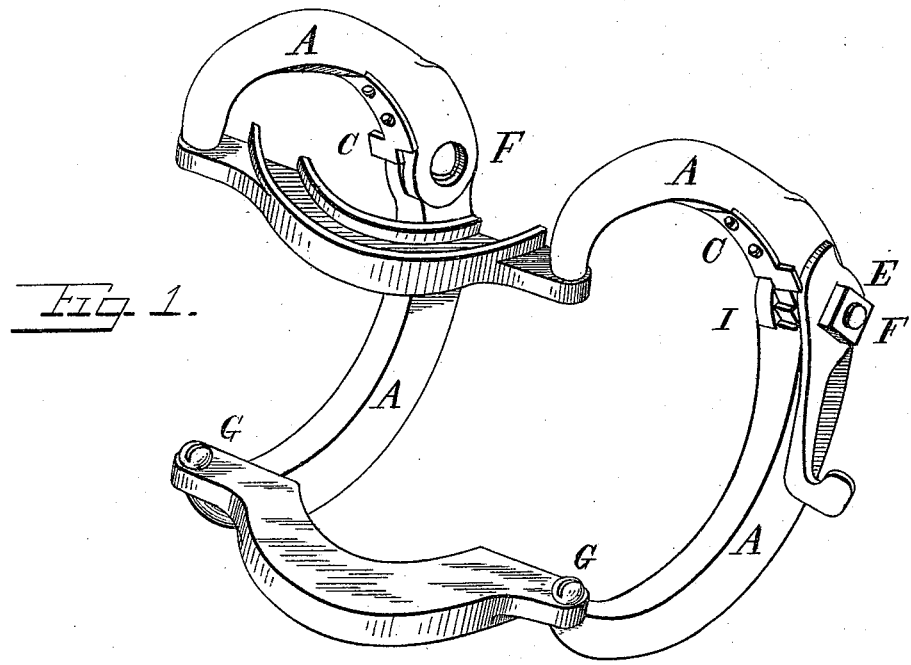
Figure 2:
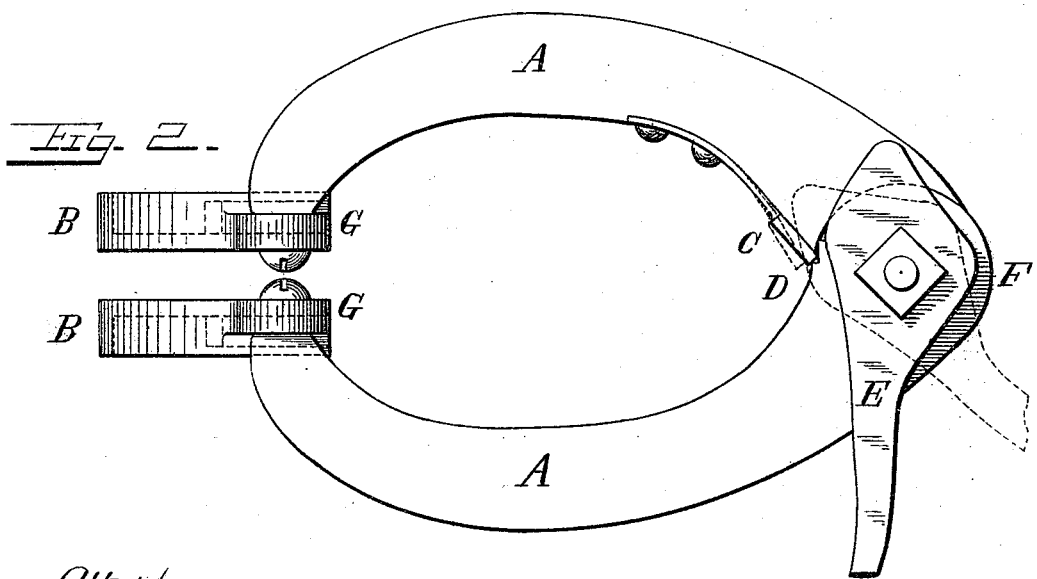

To this end my invention consists of the device hereinafter described and claimed, and fully illustrated in the accompanying drawings wherein:

Figure 1 is a perspective of the entire device opened; Fig. 2 is a side view of the same closed; Fig. 3 is a top view of same when folded for transportation; Fig. 4 is a perspective of a modified form of bit; Fig. 5 is a section showing pivot joint with the lever removed; Fig. 6 is a cross section of swivel joint; and Fig. 7 is a cross section of pivot joint on the line 7. 7. Fig. 5.

Like letters refer to like parts throughout the several views.

A are the jaws, B the bits, C the spring pawls, D the ratchet teeth, E the cam lever, F the pivot joint, and G the swivel joint.

The jaws A are four in number (two pairs), the upper one of each pair being provided with the spring pawls C, securely riveted thereunto; and the two lower pairs being provided with the ratchet teeth D, so that when both pair are pivoted together, as shown in Figs. 1, 2 and 5, the spring pawls C will engage with the ratchet teeth D.

Levers E are attached to the outer surface of each pair of jaws, being secured thereto by means of the pivot F', which couple the jaws A together. These levers E are provided with cam projections E' so shaped that when they are moved rearward, (to the position shown in dotted lines) the said projection will press against the spring pawls C, forcing them away from the ratchet teeth D. Two parallel bits or bars, B, are attached to the foward ends of the jaws A, the upper one having its opposite ends swiveled to the two upper jaws, and the lower one having its opposite ends swiveled to the two lower jaws. These bars curve outward in conformity with the shape of an animal's jaw. The upper one is provided upon its upper side with a curved groove B' to receive the animal's upper teeth, and the lower one is provided upon its under side with a similar curved groove B² to receive the animal's lower teeth.

In some cases it may be impractical to use the curved bits described, in which case the straight bits shown in Fig. 4 may be substituted therefor.

The operation of my device is as follows: The opener is placed over the nose, and the bits B placed in the mouth of the animal so that the upper front teeth shall rest in the groove B' and the lower front teeth shall rest in the groove B² of the bits B, and the jaws A rest on each side of the animal's head where they may be secured by straps, which I do not deem it necessary to show. The mouth is then forced open, by opening or distending the forward ends of the jaws A; the ratchet teeth D fashioned on the lower jaw will be carried downward in a curvilinear course while the spring pawls riveted to the upper jaws will be carried upward in a curvilinear course, and the pawls C engaging with the ratchet teeth D will hold the jaws A at any desired degree of distention. When the operation is performed or the medicine administered the opener may be released, thus allowing the animal to close its mouth, by pressing the lever E rearward as shown by dotted lines in Fig. 2, its cam head E' pressing against the spring pawls C, thus disengaging them from the ratchet teeth D. When not in use, or for convenience when carrying it from place to place, it may be folded as shown in Fig. 3, the swivel joints G permitting one pair of jaws to fold over the other pair as shown.

Having thus described my invention what I claim as new, and desire to secure by Letters Patent is:

1. The combination in an animal mouth opener of two pairs of distensible vertical jaws, each pair being separately pivoted together, the lower one of each pair provided with a set of ratchet teeth, and the upper one of each pair furnished with a spring pawl to engage the said ratchet teeth of the said lower jaw, a cam lever for releasing the said spring pawl from the said ratchet teeth, secured to the pivot or bolt which holds each pair of jaws together, and two parallel bits, one of which is connected by means of swivel joints to the outer ends of the two upper jaws, and the other one connected by means of swivel joints to the outer ends of the two lower jaws, whereby one pair of jaws may be folded over, or upon the other pair, substantially as shown and for the purposes specified.

2. The combination in an animal mouth opener having two pairs of distensible vertical jaws, each pair being separately pivoted together, one of each pair being provided with a set of ratchet teeth, and the other one of each pair furnished with a spring pawl to engage the said ratchet teeth of the opposite jaw, a cam lever for releasing the said spring pawls from the said ratchet teeth, of two parallel curved bits provided with curved grooves to receive the front teeth of the animals operated upon, the opposite ends of one of the said bits being connected by means of swivel joints to the outer ends of the two upper jaws, and the opposite ends of the other bit connected by means of swivel joints to the outer ends of the two lower jaws, whereby one pair of jaws may be folded over or upon the other pair, substantially as shown and for the purposes specified.

In witness whereof have I hereunto set my hand in the presence of two witnesses.

JAMES H. RYAN.

Witnesses:
E. B. HARNED,
W. L. JOSLYN.